United States Patent

Smart

[11] 4,119,753
[45] Oct. 10, 1978

[54] PAPERMAKER'S FELT WITH GROOVED SURFACE

[75] Inventor: Frederick R. Smart, Averill Park, N.Y.

[73] Assignee: Hyyck Corporation, Wake Forest, N.C.

[21] Appl. No.: 832,214

[22] Filed: Sep. 12, 1977

[51] Int. Cl.² ............................................. B32B 5/06
[52] U.S. Cl. ................................. 428/234; 34/243 F; 139/383 A; 428/235; 428/246; 428/280
[58] Field of Search ............... 428/234, 235, 238, 239, 428/247, 252, 255, 280, 282, 156, 163, 167, 172, 227, 257, 258, 259, 246, 294; 156/148; 139/383 A; 162/DIG. 1, 358; 34/243 F

[56] References Cited
U.S. PATENT DOCUMENTS 3,613,258 10/1971 Jamieson ........................... 162/358
3,948,722 4/1976 Wheeldon et al. .................. 162/358

Primary Examiner—James J. Bell
Attorney, Agent, or Firm—Melville, Strasser, Foster & Hoffman

[57] ABSTRACT

A papermaking felt having interwoven warp and filling yarns on its face side and bulky rib forming yarns on its machine side, the rib forming yarns lying in spaced apart relation to define water conveying channels therebetween, there being a batt surface on the face side of the fabric needled through the warp and filling yarns and into the rib forming yarns, the rib forming yarns being impregnated following needling with a resin which renders them essentially incompressible, the rib forming yarns being initially attached to the warp yarns by holding yarns which may be removed prior to the application of the resin or retained as a permanent part of the felt.

10 Claims, 4 Drawing Figures

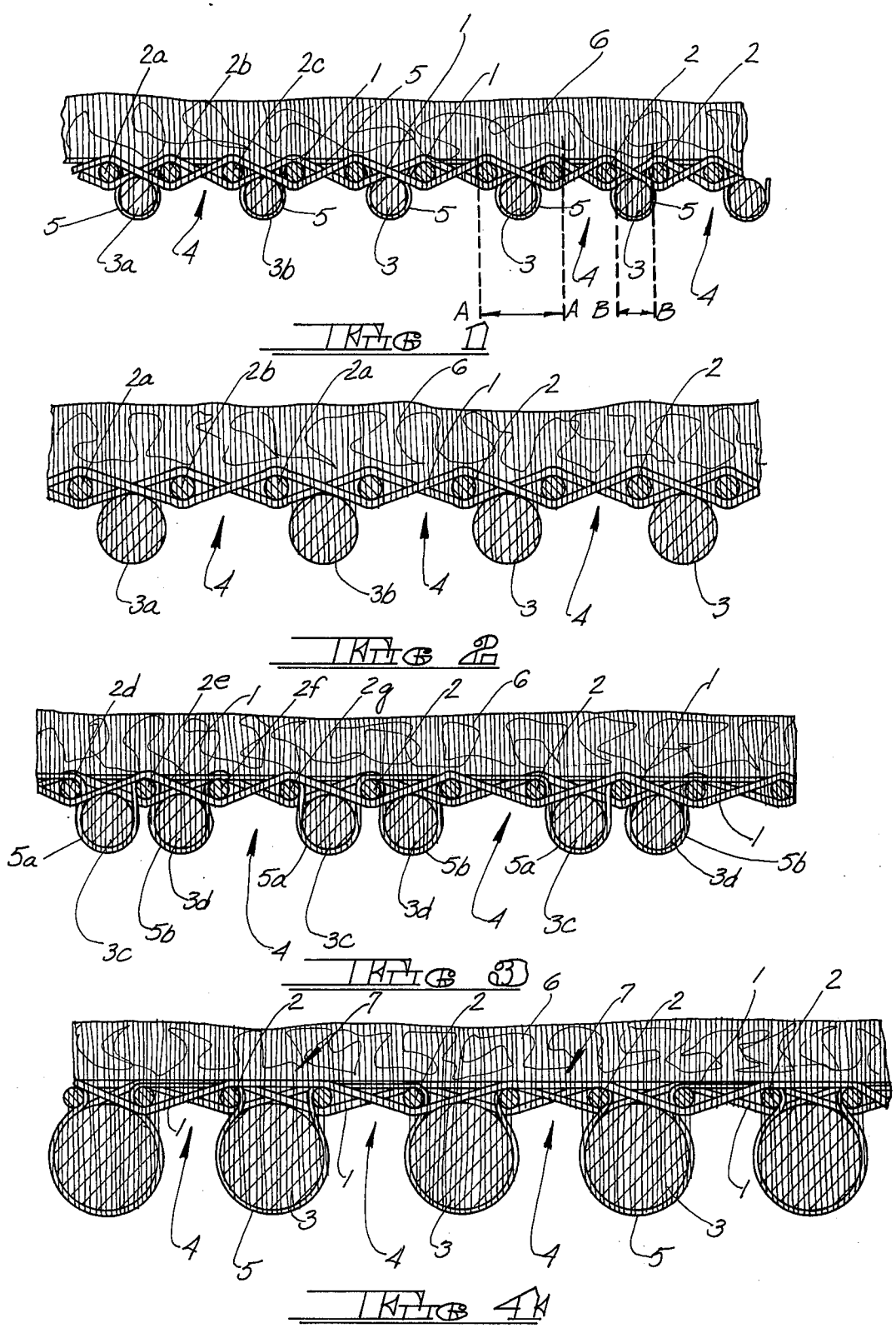

PAPERMAKER'S FELT WITH GROOVED SURFACE

This invention relates to felts for use on papermaking machines, and has to do more particularly with felts for removing water from a paper sheet while the sheet is supported on and carried by the felt.

BACKGROUND OF THE INVENTION

Various techniques have hitherto been proposed for removing water from a paper sheet, the most common being by the use of a press wherein the paper sheet and the felt on which it is carried are squeezed between rolls, the felt being formed in such a manner that the water extracted from the paper will pass through the felt for discharge. Desirably, the press felts are woven so as to have relatively large open areas or voids which will enhance their water conveying capability so that the water may be removed from the felts upon passage over a suction box.

More recently it has been proposed to enhance the water conveying capacity of the felts by providing spaced apart monofilaments on the back or machine side of the fabric, the monofilaments lying in spaced apart relation to define water conveying channels therebetween. Such monofilaments are formed from a synthetic plastic material bonded to the base fabric either by extruding the monofilaments in hot melt form and applying them directly to the base fabric or by adhering them by an adhesive, or by the use of a solvent to render the filaments tacky and hence capable of bonding to the base fabric. While the use of such plastic monofilaments has enhanced the water carrying capability of the felts, particularly when operated under high speed conditions, the use of such monofilaments has involved a number of difficulties. For example, special equipment and handling techniques are required to extrude the plastic monofilaments in molten condition and apply them to the back surface of the base fabric, and this is also true where the filaments are adhesively secured to the base fabric or are softened by a solvent prior to their application to the fabric. It has also been found that after the plastic monofilaments have been in use, they tend to crack and peel away from the base fabric, and additionally the monofilaments tend to flatten, the net result being a significant decrease in the effectiveness of the channels to perform their intended water conveying function.

In contrast to the foregoing, the present invention provides felts having improved water conveying channels formed on their machine sides by means of bulky rib forming yarns which define channels therebetween, the rib forming yarns being securely interlocked with the base fabric and treated with a resin to render them essentially incompressible, the felts being capable of being manufactured utilizing conventional equipment which is readily available in mills manufacturing conventional papermaking felts.

SUMMARY OF THE INVENTION

In accordance with the invention, the rib forming yarns are integrally woven with the base fabric, the base fabric containing what amounts to double sets of wrap and filling yarns. The face or paper carrying side of the fabric is defined by a set of warp and filling yarns of conventional pattern, such as a plain weave or a satin or twill weave in which the load bearing yarns extend in the machine direction. The bulky rib forming yarns lie on the back or machine side of the fabric and also extend in the machine direction. The rib defining yarns are initially interlocked with the face side of the fabric by means of cross machine direction holding yarns which are interwoven with the machine direction yarns on the face side of the fabric.

The bulky rib forming yarns comprise staple or multifilament yarns, whereas the holding yarns which interlock them are preferably quite light so as to minimize obstruction of the channels defined between the rib forming yarns. The rib forming yarns may be individually spaced apart by substantially equal distances, or they may be formed in pairs, the objective in either case being to provide channel forming grooves between the spaced apart rib forming yarns or sets of yarns. Sets of yarns are advantageous in certain instances to minimize pressure non-uniformities.

Following formation of the base fabric, a non-woven batting material is needled to the face side of the fabric, the needled batt material serving the dual function of defining the paper supporting surface of the felt and also acting to tightly secure the rib defining yarns to the yarns defining the face side of the fabric. To this end, the needling operation is conducted in two stages, the first being from the face side of the fabric, the batt fibers being needled through the warp and filling yarns and also the rib forming yarns so that the rib forming yarns are firmly anchored to the fabric by a multiplicity of batt fibers. In the second stage the fabric is needled from its back or machine side to remove needled batt fibers from the channels between the rib forming yarns, the projecting fibers being needled back into the face side of the fabric.

Following needling, the rib forming yarns are treated with a stabilizing resin which renders the rib forming yarns essentially incompressible and also acts to further insure against separation of the rib forming yarns from the fabric by internally bonding them to the needled batt fibers. The resin is applied to the machine side of the fabric by means of a roll coater in a quantity such that it will only saturate the rib defining yarns and the machine side of the fabric, care being taken to avoid penetration of the resin into the batt fibers on the face side of the fabric. Following the application of the resin, it is dried and cured.

In a modification of the invention, the holding yarns are formed from fibers which may be dissolved following needling, thereby eliminating the presence of yarns which obstruct the open flow area of the grooves, the holding yarns in such instance being formed from fibers which may be readily dissolved in a suitable solvent.

Accordingly, it is a principal object of the present invention to provide a papermaking felt having an enhanced capacity for removing water from a paper sheet supported on the face side of the felt, the back or machine side of the felt being of ribbed configuration defining water conveying channels therebetween.

A further object of the invention is the provision of a papermaking felt the ribbed machine surface of which is defined by bulky yarns securely anchored to the felt fabric by needling, the rib forming yarns being impregnated with a resin which stabilizes the rib forming yarns and renders them essentially incompressible, thereby maintaining the integrity of the channels defined by the rib forming yarns and enhancing the wear characteristics of the felt.

Still a further object of the invention is the provision of a papermaking felt in which the channel forming rib yarns are initially secured to the base fabric by means of holding yarns, and wherein the holding yarns may be of such character that they may be dissolved subsequent to the needling of the felt so as to further increase the void areas or channels defined by the rib forming yarns.

It is still a further object of the invention to provide an improved felt construction which, due to the increased void areas on its machine side, may be advantageously used on plain presses in a dry-nip operation.

Still a further object of the invention is the provision of felts characterized by water escape channels on their machine sides which significantly reduce shadow marking when the felts are used on suction presses.

Other objects and advantages of the invention will become apparent as the invention is more fully illustrated and set forth in the accompanying drawings and detailed description which follows.

DESCRIPTION OF THE DRAWINGS

FIG. 1 is a diagrammatic vertical sectional view illustrating a fabric in accordance with the present invention.

FIG. 2 is a diagrammatic vertical sectional view similar to FIG. 1 but enlarged illustrating the fabric subsequent to removal of the holding yarns.

FIG. 3 is a diagrammatic vertical sectional view illustrating a modification of the invention.

FIG. 4 is also a diagrammatic vertical sectional view illustrating a modification of the invention having a different weaving pattern.

It is to be understood that the figures are drawn to an enlarged scale and are diagrammatic in nature. For the purposes of the description, the surface of the felt adapted to support and carry the paper sheet will be referred to as the face or top of the fabric, while the opposite side will be referred to as the back or machine side of the fabric.

DESCRIPTION OF THE PREFERRED EMBODIMENTS

Referring first to FIG. 1 of the drawings, the base fabric comprises warp yarns 1 and filling yarns 2 woven together in conventional fashion, the weave illustrated being a plain weave. It is to be understood that when the fabric is woven endless, the warp yarns 1 will lie in the cross machine direction in use and the filling yarns 2 will lie in the machine direction. Other weave patterns may be employed, such as a satin or twill weave, depending upon the characteristics to be imparted to the face surface of the fabric. The warp and filling yarns 1 and 2, respectively, may be formed from any of the materials normally employed to manufacture press felts, such as wool or synthetic fibers, or combinations thereof.

In accordance with the invention, the back or machine surface of the fabric is defined by bulky rib forming yarns 3 extending in parallel relation to the filling yarns 2, the rib forming yarns being spaced apart to define grooves or channels 4 therebetween. Preferably the orientation of the rib forming yarns 3 will be such that they lie below and between an adjacent pair of the filling yarns 2, such as the yarns 2a and 2b, the filling yarn 2b in conjunction with the next adjacent filling yarn 2c and the warp yarns 1 providing effective bridging in the areas of the channels 4. The rib forming yarns 3 preferably will be formed from a staple yarn or multi-filament yarn, such as spun Nylon, since it is essential to the invention that the rib forming yarns are of a character which may be readily needled and also saturated with resin, the yarns having capillaries or interstices into which the resin will wick. The rib forming yarns will be bulky as compared to the warp and filling yarns. By way of example, the size of the rib forming yarns will normally vary between the diameters represented by the lines A—A and B—B shown in the right hand portion of FIG. 1, the size of the rib forming yarns varying with the size and spacing between adjacent filling yarns 2. In the embodiment illustrated, the rib forming yarns are close to minimum size.

The rib forming yarns 3 are joined to the fabric by means to holding yarns 5 which pass over a first of the filling yarns, such as the filling yarn 2a, then downwardly beneath the rib forming yarn 3a and then upwardly over the adjacent filling yarn 2b and also over the next adjacent filling yarn 2c, whereupon the holding yarn passes downwardly for passage beneath the next rib forming yarn 3b, the pattern being repeated throughout the cross machine dimension of the fabric. The holding yarns 5 are intended to initially anchor the rib forming yarns to the warp and filling yarns and hold them in position for subsequent needling. Preferably the holding yarns will be very light, such as 300–400 denier, so as to minimize interference with the open flow areas of the channels 4. The number of holding yarns may vary, but usually one holding yarn for every two or three warp yarns provides effective rib yarn retention. Where the holding yarns are to be retained as an integral part of the fabric, they may comprise any of the conventional yarns, such as a cotton yarn.

If the fabric is woven endless, it may be placed directly on a conventional needling machine; but if the fabric is woven flat, it will first be spliced to form an endless belt. Endless weaving is preferred in that it eliminates the necessity for splicing together the ends of the bulky rib forming yarns.

A conventional non-woven batting material 6 is placed on the face side of the fabric and needled thereto. The needling is performed in two stages, the first being from the face side of the fabric, a portion of the batt forming fibers being caused to pass through the warp and filling yarns 1 and 2 and into and even through the underlying rib forming yarns 3. Following the initial needling operation, the fabric is turned over and needled from its back or machine side so that the protruding batt fibers, particularly in the areas of the channels 4, will be pushed back into the overlying fabric, thereby maintaining the channels 4 essentially free from obstructions. The needling operation thus serves to provide the desired surface finish on the face side of the fabric and also securely anchors the rib forming yarns to the machine side of the fabric.

In accordance with the invention, the holding yarns 5 may be retained as an integral part of the fabric, or in the alternative they may be removed to maximize the size of the channels where even greater water conveying capacity is desired. If the holding yarns are to be removed, they will be formed from fibers which may be readily dissolved, preferably by submersion in water. For example, holding fibers formed from polyvinyl alcohol are readily soluble in water at a temperature of 140°–150° F. The alginate fibers, such as calcium alginate, are also readily soluble in water and may be used to form the holding yarns. Alternately, the holding yarns may be dissolved by other solvents, such as by the use of an inorganic salt, depending upon the nature of the fibers from which the holding yarns are formed. For example, if polyamide or acrylic fibers are used, they may be treated with a solution of calcium thiocyanate.

FIG. 2 illustrates the fabric after the holding fibers have been removed, and it will be evident thet the open areas of the grooves 4 have been enlarged by reason of the elimination of the holding yarns.

Irrespective of whether or not the holding yarns are removed, the rib forming yarns 3 will be subjected to a resin treatment for the dual purpose of rendering the rib forming yarns effectively incompressible and also to effect a tight bond between the rib forming yarns and the batt fibers which are needled to the rib forming yarns. Numerous resins are available for such purpose, including melamine formaldehyde and various latex resins, such as acrylic latex. Preferably the resin will be in dilute form, such as a solution containing a 6–10% solids, and will be applied to the back or machine side of the fabric by means of an applicator roll, the quantity of resin applied being sufficient to saturate the rib forming yarns but insufficient to strike through to saturate the batt fibers on the face side of the fabric. By keeping the viscosity of the resin relatively low, it will wick into and fill the capillaries of the rib forming yarns. The resin, when dried and cured, will stabilize the rib forming yarns and maintain them in essentially incompressible condition, thereby maintaining the integrity of the water conveying channels. As used herein the term essentially incompressible is intneded to denote a condition wherein the compressibility of the rib forming yarns is reduced by the saturating resin to the extent of providing enhanced wear characteristics on the machine side of the fabric, with particular reference to resistance against deformation of the rib forming yarn.

FIG. 3 illustrates a modification of the invention wherein the rib forming yarns are formed in pairs comprising yarns 3c and 3d, each such pair being initially secured to the filling yarns 2 by the holding yarns 5 which, in this instance, separatly anchor the rib forming yarns in each pair. To this end, rib forming yarn 3c lies between overlying filling yarns 2d and 2e, and yarn 3d lies between overlying filling yarns 2e and 2f. Rib forming yarn 3a is anchored by holding yarn 5a which passes over filling yarn 2d, beneath rib forming yarn 3c, then upwardly over filling yarns 2e and also over adjacent filling 2f and 2g, whereupon the pattern is repeated. The rib forming yarn 3d is anchored by holding yarn 5b which passes over filling yarn 2c, beneath rib forming yarn 3d and then upwardly over filling yarns 2f, 2g and 2h, whereupon the pattern is repeated. Channels 4 are thus formed between the adjacent sets of rib forming yarns, and while the number of channels per unit of felt width is decreased, the pairs of rib forming yarns provide enhanced wear characteristics on the machine side of the fabric and also enhance the integrity of the channels by enlarging the areas of increased incompressibility. It is preferred to individually anchor the pairs of rib forming yarns rather than anchor each pair to a single holding yarn, although both rib yarns in each pair may be anchored by a single holding yarn. The number of holding yarns may vary but one holding yarn for every two or three warp yarns provides effective retention.

FIG. 4 is illustrative of a modification of the invention wherein the weave pattern of the warp and filling yarns is altered, each of the warp yarns having two floats on the face side of the fabric, indicated at 7, the resultant fabric having the surface characteristics of a twill weave. It will be understood that additional pattern variations may be readily achieved by altering the sequence of the yarns, as will be readily understood by the worker in the art. FIG. 4 also illustrates the use of rib forming yarns which are of substantially maximum diameter relative to the spacings between the filling yarns.

As should now be apparent, the present invention provides papermaking felts the back or machine sides of which are provided with grooves or channels which materially enhance the water handling capacity of the felt, the fabric having enhanced wear characteristics due to the manner in which the rib forming yarns are anchored, as well as the manner in which they are impregnated with resin. The fabrics can be readily woven, needled, and impregnated using equipment which is readily available in mills which manufacture conventional papermaking fabrics.

It is to be understood that modifications may be made in the invention without departing from its spirit and purpose. Various such modifications have already been set forth and others will undoubtedly occur to the worker skilled in the art upon reading this specification, and consequently it is not intended that the invention be limited other than in the manner set forth in the claims which follow.

The embodiments of the invention in which an exclusive property or privilege is claimed are defined as follows:

1. A papermaking fabric having a face side and a machine side, said fabric comprising interwoven warp and filling yarns on the face side of the fabric, bulky rib forming yarns on the machine side of the fabric, said rib forming yarns comprising staple or multifilament yarns extending in parallel relation and lying in spaced apart relation relative to each other to define channels therebetween, a batt surface on the face side of said fabric needled through said warp and filling yarns and into said rib forming yarns, with the channels therebetween being essentially free of batt fibers, said rib forming yarns being impregnated with a resin capable of rendering said rib forming yarns essentially incompressible in use, the batt surface on the face side of the fabric being essentially free from resin.

2. The papermaking fabric claimed in claim 1 including holding yarns interconnecting said rib forming yarns with the face side of the fabric.

3. The papermaking fabric claimed in claim 2 wherein said holding yarns are compsoed of fibers capable of being dissolved by a solvent.

4. The papermaking fabric claimed in claim 3 wherein said fibers are water soluble.

5. The papermaking fabric claimed in claim 1 wherein said rib forming yarns lie between adjacent overlying filling yarns, and wherein the rib forming yarns defining the opposite sides of each channel are spaced apart by a distance such that two adjacent overlying filling yarns lie between the rib forming yarns defining the opposite sides of each channel.

6. The papermaking fabric claimed in claim 5 including holding yarns connecting said rib forming yarns to the face side of the fabric, said holding yarns passing beneath each rib forming yarn and over the filling yarns on opposite sides of each rib forming yarn.

7. The papermaking fabric claimed in claim 6 wherein the holding yarns pass over the two adjacent filling yarns lying between the rib forming yarns defining the opposite sides of each channel.

8. The papermaking fabric claimed in claim 5 wherein said rib forming yarns are in pairs.

9. The papermaking fabric claimed in claim 8 including holding yarns interconnecting said pairs of rib forming yarns with the face side of the fabric.

10. The papermaking fabric claimed in claim 9 wherein the rib forming yarns in each pair are anchored by separate holding yarns.

* * * * *

UNITED STATES PATENT AND TRADEMARK OFFICE
CERTIFICATE OF CORRECTION

PATENT NO. : 4,119,753

DATED : October 10, 1978

INVENTOR(S) : Frederick R. Smart

It is certified that error appears in the above—identified patent and that said Letters Patent are hereby corrected as shown below:

Column 1, line 64, "wrap" yarns to "warp" yarns

*Signed and Sealed this*

*Tenth* Day of *July 1979*

[SEAL]

*Attest:*

LUTRELLE F. PARKER

*Attesting Officer*     *Acting Commissioner of Patents and Trademarks*